United States Patent
Brooks et al.

(10) Patent No.: US 8,796,880 B2
(45) Date of Patent: Aug. 5, 2014

(54) VARIABLE ADAPTER ID CIRCUIT

(75) Inventors: Robert C Brooks, Houston, TX (US);
Patrick L Ferguson, Cypress, TX (US);
Robert S Wright, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 13/203,608

(22) PCT Filed: Feb. 27, 2009

(86) PCT No.: PCT/US2009/035556
§ 371 (c)(1),
(2), (4) Date: Aug. 26, 2011

(87) PCT Pub. No.: WO2010/098773
PCT Pub. Date: Sep. 2, 2010

(65) Prior Publication Data
US 2011/0316521 A1    Dec. 29, 2011

(51) Int. Cl.
*H02J 3/14* (2006.01)
(52) U.S. Cl.
USPC .......................................................... 307/31
(58) Field of Classification Search
USPC .............. 713/324; 700/286; 307/31; 323/318
See application file for complete search history.

(56) References Cited

U.S. PATENT DOCUMENTS

| | | | |
|---|---|---|---|
| 5,485,117 A | 1/1996 | Furumochi | |
| 5,506,490 A | 4/1996 | DeMuro | |
| 5,930,496 A | 7/1999 | MacLaren et al. | |
| 6,181,118 B1 | 1/2001 | Meehan et al. | |
| 6,400,102 B1 * | 6/2002 | Ghanem | 315/291 |
| 6,950,950 B2 | 9/2005 | Sawyers et al. | |
| 2002/0196074 A1 | 12/2002 | Kanda et al. | |
| 2007/0139021 A1 | 6/2007 | Kojima et al. | |
| 2009/0322152 A1 * | 12/2009 | Jung et al. | 307/66 |

OTHER PUBLICATIONS

Robert C. Brooks et al., "Notification of Transmittal of the International Search Report and the Written Opinion of the International Searching Authority, or the Declaration," International Application No. PCT/US2009/035556 (filed Feb. 27, 2009), Date of Mailing: Oct. 28, 2009, pp. 1-10.

* cited by examiner

*Primary Examiner* — Daniel Cavallari

(57) ABSTRACT

A first resistance (125) within a power supply (110) can be connected to a power supply output (120). A variable resistance (130) can be serially coupled with the first resistance, thereby providing a first intermediate voltage at a point (115) disposed between the first resistance and the variable resistance. The variable resistance can be at a maximum in the absence of an expansion device (140) and at less than maximum in the presence of an expansion device. The first intermediate voltage and a second intermediate voltage (145) can be introduced to a comparator (150). The comparator can provide an output signal (170) when the first intermediate voltage exceeds the second intermediate voltage. The comparator output signal can be used to confirm the power supply capacity to power an external device (180) and to enable one or more external device functions.

15 Claims, 4 Drawing Sheets

VARIABLE ADAPTER ID CIRCUIT

BACKGROUND OF THE INVENTION

Description of the Related Art

The use of external power supply or power converter "bricks" is ubiquitous within the electronics industry. Power supplies and power converters are available in a wide range of output power and voltage combinations, with the larger capacity and higher voltage supplies typically being physically larger and more costly than their lower capacity and lower voltage brethren. As a consequence, the capacity and output voltage of a power supply or converter is often matched quite closely to the intended load. When a user modifies an electronic device in a manner that affects the power consumption of the device, the power supply may have insufficient capacity or voltage to adequately power the modified device. The use of an undersized power supply or converter can result in damage to the power supply, the electronic device, or both the power supply and the electronic device.

SUMMARY OF THE INVENTION

A detection system is provided. A fixed first resistance within a power supply can be operatively connected to a power supply output. A variable resistance can be serially coupled with the first resistance, thereby providing a first intermediate voltage at a point disposed between the first resistance and the variable resistance. The variable resistance can be at a maximum in the absence of an expansion device and at less than maximum in the presence of an expansion device. The first intermediate voltage and a second intermediate voltage can be introduced to a comparator. The comparator can provide an output signal having a positive voltage when the first intermediate voltage exceeds the second intermediate voltage. The comparator output signal can be used to confirm the power supply capacity to power an external device and to enable one or more external device functions.

A detection method is also provided. A power supply output can be operably connected to an external device. At least a portion of the power supply output can be passed through a first circuit having a first resistance and a variable resistance operably connected in series. A first intermediate voltage can be measured at a point disposed between the first resistance and the variable resistance. At least a portion of the power supply output can be passed through a second circuit having a fourth resistance and a fifth resistance operatively coupled in series. A second intermediate voltage can be measured at a point disposed between the fourth resistance and the fifth resistance. The first and second intermediate voltages can be compared using a comparator. One or more external device features can be enabled when the first intermediate voltage exceeds the second intermediate voltage.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logical device, software, or other entity. Logical and/or physical communication channels can be used to create an operable connection.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
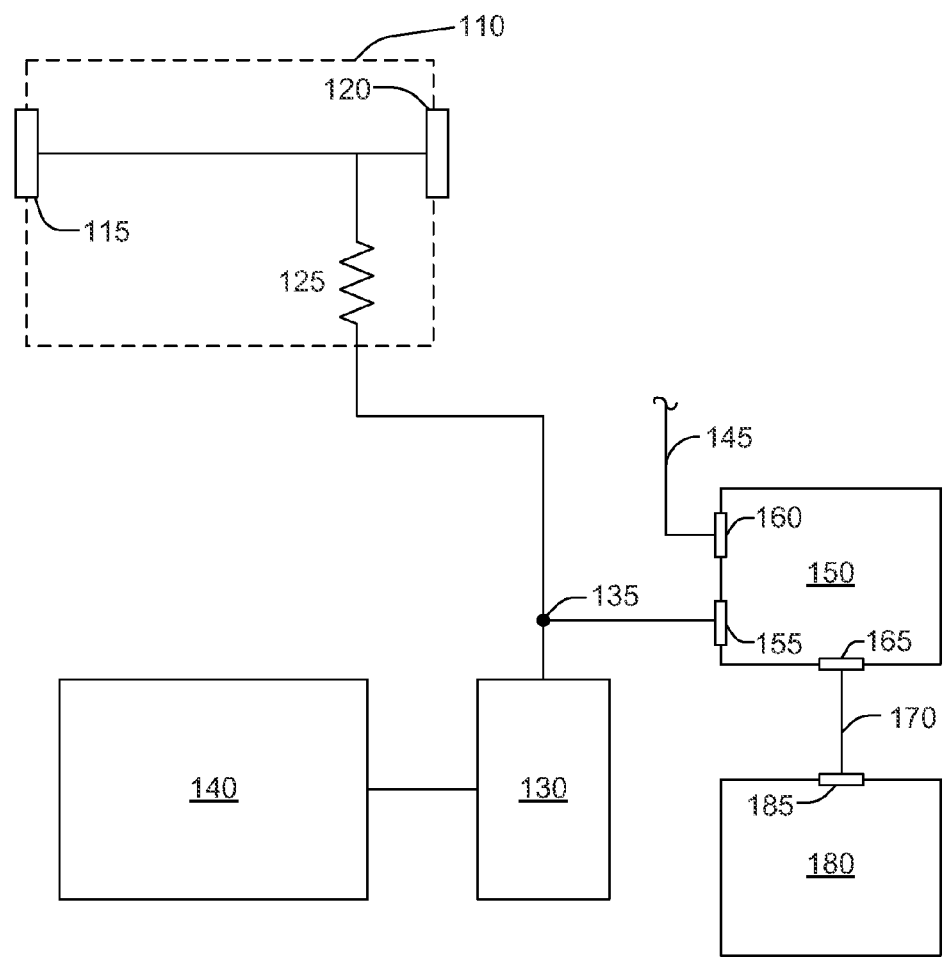
FIG. 1 is a schematic view of an illustrative detection system, in accordance with one or more embodiments described herein.

FIG. 1 is a schematic view of an illustrative detection system 100, in accordance with one or more embodiments. In one or more embodiments, the detection system can include a power supply 110 having a power input 115 and a power output 120. One or more fixed resistances 125 can be disposed in, on, or about the power supply 110. In one or more embodiments, a variable resistance 130 can be operatively connected in series with the first resistance 125. In one or more embodiments, the variable resistance 130 can be dependent upon the presence or absence of an expansion device 140, for example, the variable resistance 130 can have a maximum value when no expansion devices 140 are present and a less than maximum value when at least one expansion device 140 is present.

In one or more embodiments, a first intermediate voltage can exist at a point 135 disposed between the first resistance 125 and the variable resistance 130. In one or more embodiments, the first intermediate voltage can be introduced to a first signal input 155 disposed in, on, or about a comparator 150. In one or more specific embodiments, a second intermediate voltage 145 can be similarly introduced to a second signal input 160 disposed in, on, or about the comparator 150. The comparator 150 can generate an output signal 170 which can be transmitted from a signal output 165 to a signal input 185 disposed in, on, or about an external device 180.

In one or more embodiments, the power supply 110 can be any device, system, or combination of systems and/or devices suitable for adjusting, adapting, or otherwise converting the power supplied via the input 115 to an output power taken from the power supply via the output 120. In one or more embodiments, the power supply 110 can change the voltage of the input power supplied to the input 115 of the power supply 110. In one or more embodiments, the power supply 110 can change the waveform of the power supplied to the input 115 of the power supply 110. In one or more embodiments, the power supply 110 can include one or more transformers having a power capacity of from about 5 W to about 500 W; from about 15 W to about 300 W; or from about 50 W to about 200 W.

In one or more embodiments, the input power supplied to the power supply 110 via the input 115 can have a voltage of from about 50V to about 300V; from about 80V to about 240V; or from about 100V to about 120V. In one or more embodiments, the input power supplied to the power supply 110 via the input 115 can be a single-phase alternating current, a multi-phase alternating current, a direct current, or any combination thereof. In one or more embodiments, the input power supplied to the power supply 110 via the input 115 can be an alternating current having a frequency of from about 20 Hz to about 80 Hz; from about 35 Hz to about 70 Hz; or from about 45 Hz to about 65 Hz. In one or more specific embodiments, the input power supplied to the power supply 110 via the input 115 can be a single phase, 60 Hz, alternating current, at or about 120V.

In one or more embodiments, the output power supplied by the power supply 110 via the output 120 can have a voltage of from about 3V to about 50V; from about 4V to about 30V; or from about 5V to about 20V. In one or more embodiments, the output power supplied by the power supply 110 via the output 120 can have any waveform, for example a single-phase alternating current, a multi-phase alternating current, a direct current, a sawtooth current, a square wave current, or combinations thereof.

In one or more embodiments, a first resistance 125 can be disposed in, on, or about the power supply 110. In one or more embodiments, the first resistance 125 can have a fixed resistance value. In one or more embodiments, the first resistance 125 can be operatively connected to the output power of the power supply 110. In one or more embodiments, the first resistance 125 can have a resistance of from about 25KΩ to about 1MΩ; from about 50KΩ to about 750KΩ; or from about 100KΩ to about 500KΩ. In one or more specific embodiments, the resistance of the first resistance can be based upon the capacity of the power supply, for example, the first resistance 110 can have a resistance of about 383KΩ when the power supply 110 capacity is 65 W; a resistance of about 294KΩ when the power supply 110 capacity is 90 W; a resistance of about 221KΩ when the power supply 110 capacity is 120 W; a resistance of about 169KΩ when the power supply 110 capacity is 135 W; or a resistance of about 130KΩ when the power supply 110 capacity is 180 W.

In one or more embodiments, the first resistance 125 can be any system, device, or combination of systems and/or devices suitable for providing a fixed resistance value at the expected operating conditions of the power supply 110. In one or more embodiments, the first resistance 125 can be any type of resistor, including, but not limited to, a carbon composition resistor, a carbon film resistor, a thick film resistor, a thin film resistor, a metal film resistor, a wirewound resistor, a foil resistor, a metal-oxide resistor, a cermet resistor, a phenolic resistor, a tantalum resistor, or any combination thereof. In one or more embodiments, the first resistance can include two or more resistors connected in series, parallel, or any combination thereof to provide the desired final resistance value.

In one or more embodiments, the first resistance 125 can be operatively connected in series with a variable resistance 130. In one or more embodiments, the resistance of the variable resistance 130 can be dependent upon the number of expansion devices 140 operably connected to the external device 180. In one or more specific embodiments, the resistance of the variable resistance 130 can be at a maximum value when no expansion devices 140 are operably connected to the external device 180. In one or more specific embodiments, the resistance of the variable resistance 130 can be at less than maximum value when one or more expansion devices 140 are operably connected to the external device 180. In one or more specific embodiments, the resistance of the variable resistance 130 can be reduced in direct or indirect proportion to the number of expansion devices 140 operably connected to the external device 180, for example the resistance of the variable resistance 130 can be lower when two expansion devices 140 are operably connected to the external device 180 than when only a single expansion device 140 is operably connected to the external device 180.

In one or more embodiments, a first intermediate voltage can exist at a point 135 disposed between the first resistance 125 and the variable resistance 130. In one or more embodiments, the circuit formed by the serial connection of the first resistance 125 with the variable resistance 130 can create a voltage divider circuit ("first circuit"). Varying the resistance of the variable resistance 130 can alter the voltage at the point 135, for example, as the resistance of the variable resistance 130 is lowered, the first intermediate voltage measured at point 135 will be lowered proportionately. Conversely, as the as the resistance of the variable resistance 130 is increased, the first intermediate voltage measured at point 135 will be increased proportionately.

In one or more embodiments, the one or more expansion devices 140 can include any system, device, or any combination of systems and/or devices operatively connected to the external device 180. In one or more embodiments, the one or more expansion devices 140 can include an expansion card, for example a sound card, a video card, a network adapter, a TV tuner card, a video processing card, a modem or the like added to a motherboard operatively connected to a computing device. In one or more embodiments, the one or more expansion devices 140 can be operatively connected to the external device 180 via one or more card slots disposed on or about a computing device motherboard. In one or more embodiments, the one or more card slots can have one or more presence detection bits disposed therein to detect the presence of an expansion device 140. In one or more embodiments, the expansion device 140 can be compliant with any current or future industry standard for interfacing expansion devices 140 to computing devices. In one or more specific embodiments, the one or more expansion devices 140 can include, but are not limited to, one or more PCI compliant expansion cards, one or more PCI Express compliant expansion cards, one or more AGP compliant expansion cards, one or more ISA compliant expansion cards, one or more MCA compliant expansion cards, one or more VLB compliant expansion cards, or the like.

In one or more embodiments, the first intermediate voltage can be introduced to the comparator 150. The comparator 150 can be any device, system, or combination of systems and/or devices adapted to compare input voltages and provide a binary output signal based upon the relative voltages of the input signals. In one or more specific embodiments, the first intermediate voltage can be introduced to a first signal input 155 disposed in, on, or about the comparator 150. In one or more specific embodiments, a fixed second intermediate voltage 145 can be introduced to a second signal input 160 disposed in, on, or about the comparator 150.

In one or more specific embodiments, a signal output 165 can be disposed in, on, or about the comparator 150. In one or more embodiments, an output signal 170 can be provided at the signal output 165 of the comparator 150. The output signal 170 can be a binary or digital signal. In one or more specific embodiments, the output signal 170 can be a binary, i.e. high/low signal. In one or more specific embodiments, the output signal 170 can be a binary high signal when the first intermediate voltage exceeds the second intermediate voltage 145. In one or more specific embodiments, the output signal 170 can be a binary low signal when the second intermediate voltage 145 equals or exceeds the first intermediate voltage.

In one or more embodiments, the output signal 170 can be introduced to one or more signal inputs 185 disposed in, on, or about the external device 180. The external device 180 can be any electronic device powered in whole or in part using the power supply 110, and suitable for the installation of one or more expansion devices 140. In one or more specific embodiments, the external device 180 can include one or more circuit or logic boards disposed in, on, or about a computing device, for example one or more mother or daughter boards disposed in, on, or about a portable, laptop, ultraportable, netbook, desktop or workstation personal computer.

The one or more signal inputs 185 can include, but are not limited to, any input suitable for the receipt of a digital signal or an analog signal. In one or more embodiments, the one or more signal inputs 185 can include one or more inputs disposed in, on, or about a dedicated input/output ("I/O") module, for example a super I/O controller, for example the NS307, NS308, NS 309, NS317, NS338, and NS351 series of super I/O controllers produced by National Semiconductor. In one or more embodiments, the one or more signal inputs 185 can include one or more inputs disposed in, on, or about a non-dedicated I/O module, for example a General Purpose I/O ("GPIO") input disposed in, on, or about a microprocessor, microcontroller or interface device.

Figure 2:
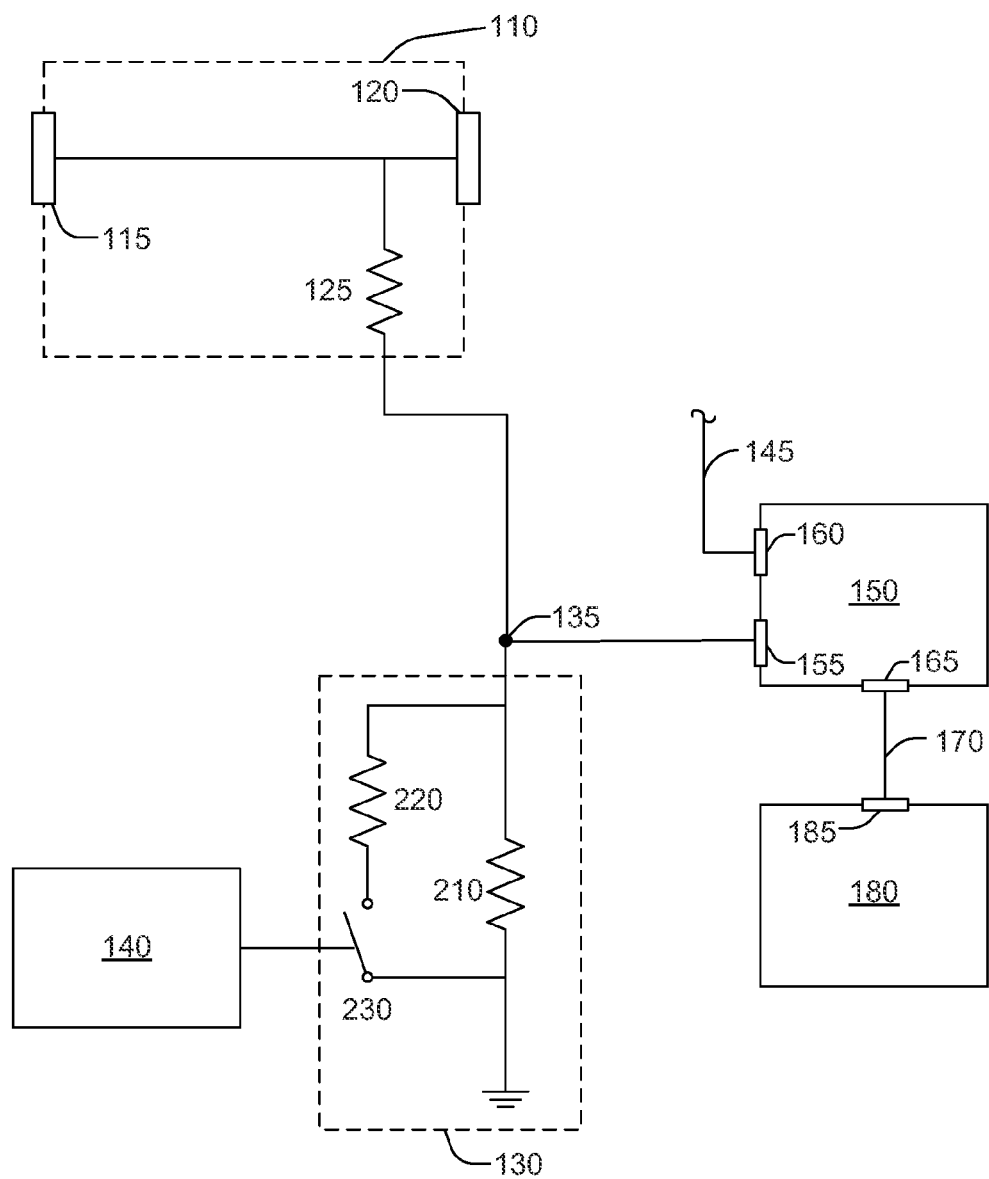
FIG. 2 is another schematic view of the illustrative detection system depicted in FIG. 1, in accordance with one or more embodiments described herein.

FIG. 2 is another schematic view of the illustrative detection system depicted in FIG. 1, in accordance with one or more embodiments. In one or more embodiments, the variable resistance 130 can include one or more second resistances 210, third resistances 220 and switching devices 230. In one or more embodiments, the second resistance 210 can be operably connected in series with the first resistance 125. In one or more embodiments, the third resistance 220 and the switching device 230 can be operably connected in series, and the series combination of the third resistance 220 and the switching device 230 can be operably connected in parallel with the second resistance 210.

In one or more embodiments, all or a portion of the second resistance 210 can be disposed in, on, or about the external device 180. In one or more embodiments, all or a portion of the second resistance can be disposed in, on, or about the expansion device 140. In one or more embodiments, the second resistance 210 can have a fixed resistance value. In one or more embodiments, the second resistance 210 can have a resistance of from about 10KΩ to about 750KΩ; from about 25KΩ to about 500KΩ; or from about 50KΩ to about 250KΩ. In one or more specific embodiments, the resistance of the second resistance 210 can be based upon the power required by the external device 180, for example, the second resistance 210 can have a resistance of about 191KΩ when the external device 180 power requirement is about 65 W; a resistance of about 147KΩ when the external device 180 power requirement is about 90 W; a resistance of about 110KΩ when the external device 180 power requirement is about 120 W; a resistance of about 84.5KΩ when the external device 180 power requirement is about 135 W; a resistance of about 64.9KΩ when the external device 180 power requirement is about 180 W.

In one or more embodiments, the second resistance 210 can be any system, device, or combination of systems and/or devices suitable for providing a fixed resistance value at the expected operating conditions of the external device 180. In one or more embodiments, the second resistance 210 can be any type of resistor, including, but not limited to, a carbon composition resistor, a carbon film resistor, a thick film resistor, a thin film resistor, a metal film resistor, a wirewound resistor, a foil resistor, a metal-oxide resistor, a cermet resistor, a phenolic resistor, a tantalum resistor, or any combination thereof. In one or more embodiments, the second resistance 210 can include two or more resistors connected in series, parallel or any combination thereof to provide the desired final resistance value.

In one or more embodiments, all or a portion of the third resistance 220 can be disposed in, on, or about the external device 180. In one or more embodiments, all or a portion of the third resistance 220 can be disposed in, on, or about the expansion device 140. In one or more embodiments, the third resistance 220 can have a fixed resistance value. In one or more embodiments, the third resistance 220 can have a resistance of from about 10KΩ to about 1MΩ; from about 25KΩ to about 750KΩ; or from about 50KΩ to about 500KΩ. In one or more specific embodiments, the resistance of the second resistance 210 can be based upon the power required by the expansion device 140, for example, the third resistance 220 can be inversely proportional to the power requirement of the expansion device 140, i.e. the resistance value of the third resistance 220 can decrease as the power requirement of the expansion device 140 increases.

In one or more embodiments, the third resistance 220 can be any system, device, or combination of systems and/or devices suitable for providing a fixed resistance value at the expected operating conditions of the external device 180 or the expansion device 140. In one or more embodiments, the third resistance 220 can be any type of resistor, including, but not limited to, a carbon composition resistor, a carbon film resistor, a thick film resistor, a thin film resistor, a metal film resistor, a wirewound resistor, a foil resistor, a metal-oxide resistor, a cermet resistor, a phenolic resistor, a tantalum resistor, or any combination thereof. In one or more embodiments, the third resistance 220 can include two or more resistors connected in series, parallel or any combination thereof to provide the desired final resistance value.

In one or more embodiments, the switching device 230 can be mechanically, logically, or electrically connected to the expansion device 140. In one or more specific embodiments, the switching device 230 can be normally open, closing when one or more expansion devices 140 are operably connected to the external device 180.

Figure 3:
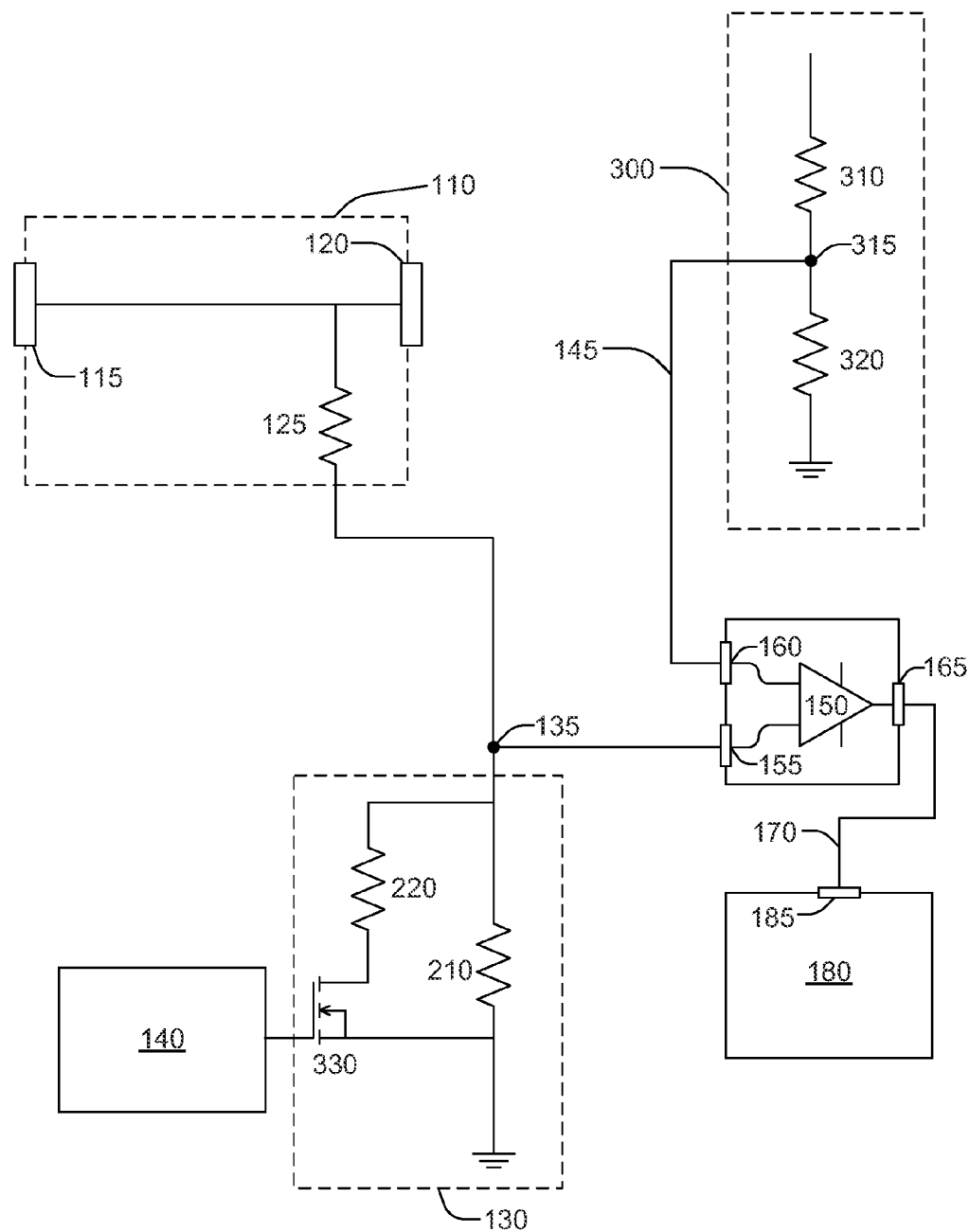
FIG. 3 is yet another schematic view of the illustrative detection system depicted in FIG. 1, in accordance with one or more embodiments described herein.

FIG. 3 is yet another schematic view of the illustrative detection system depicted in FIG. 1, in accordance with one or more embodiments. In one or more embodiments, a fourth resistance 310 and a fifth resistance 320 can be operatively connected in series to provide the second intermediate voltage 145 at a point 315 disposed between the fourth and fifth resistances. In one or more embodiments, the circuit formed by the serial connection of the fourth resistance 310 and the fifth resistance 320 can create a voltage divider circuit ("second circuit"). In one or more embodiments, although not depicted in FIG. 3, all or a portion of the power provided to the second circuit can be supplied by the power output 120. In one or more embodiments, the second intermediate voltage 145 can be at a level of from about 10% of the power supply 110 output voltage to about 80% of the power supply 110 output voltage; about 17.5% of the power supply 110 output voltage to about 60% of the power supply 110 output voltage; or about 25% of the power supply 110 output voltage to about 40% of the power supply 110 output voltage. In one or more specific embodiments, the second intermediate voltage 145 can be at a level of about 30% of the power supply 110 output voltage.

In one or more embodiments, the fourth resistance 310 can be disposed, in whole or in part, in, on, or about the external device 180. In one or more embodiments, the fourth resistance 310 can be disposed, in whole or in part, in, on, or about the expansion device 140. In one or more embodiments, the fourth resistance 310 can have a fixed resistance value. In one or more embodiments, the fourth resistance 310 can have a resistance of from about 1KΩ to about 1M ohms; from about 5KΩ to about 750KΩ; from about 10KΩ to about 500KΩ; or from about 20KΩ to about 200KΩ. In one or more specific embodiments, the fourth resistance 310 can have a fixed resistance value of about 22.6KΩ plus or minus the tolerance of the resistor or resistors forming the fourth resistance 310.

In one or more embodiments, the fourth resistance 310 can be any system, device, or combination of systems and/or devices suitable for providing a fixed resistance value at the expected operating conditions of the external device 180 or the expansion device 140. In one or more embodiments, the fourth resistance 310 can be any type of resistor, including, but not limited to, a carbon composition resistor, a carbon film resistor, a thick film resistor, a thin film resistor, a metal film resistor, a wirewound resistor, a foil resistor, a metal-oxide resistor, a cermet resistor, a phenolic resistor, a tantalum resistor, or any combination thereof. In one or more embodiments, the fourth resistance 310 can include two or more resistors connected in series, parallel or any combination thereof to provide the desired final resistance value.

In one or more embodiments, the fifth resistance 320 can be operatively connected to the fourth resistance 310. In one or more embodiments, the fifth resistance 320 can be disposed, in whole or in part, in, on, or about the external device 180. In one or more embodiments, the fifth resistance 320 can be disposed, in whole or in part, in, on, or about the expansion device 140. In one or more embodiments, the fifth resistance 320 can have a fixed resistance value. In one or more embodiments, the fifth resistance 320 can have a resistance of from about 1KΩ to about 1MΩ; from about 3.3KΩ to about 750KΩ; or from about 5KΩ to about 150KΩ. In one or more specific embodiments, the fifth resistance 320 can have a fixed resistance value of about 10KΩ plus or minus the tolerance of the resistor or resistors forming the fifth resistance 320.

In one or more embodiments, the fifth resistance 320 can be any system, device, or combination of systems and/or devices suitable for providing a fixed resistance value at the expected operating conditions of the external device 180 or the expansion device 140. In one or more embodiments, the fifth resistance 320 can be any type of resistor, including, but not limited to, a carbon composition resistor, a carbon film resistor, a thick film resistor, a thin film resistor, a metal film resistor, a wirewound resistor, a foil resistor, a metal-oxide resistor, a cermet resistor, a phenolic resistor, a tantalum resistor, or any combination thereof. In one or more embodiments, the fifth resistance 320 can include two or more resistors connected in series, parallel or any combination thereof to provide the desired final resistance value.

In one or more embodiments, the switching device 230 can be a transistor device, for example a metal-oxide-semiconductor field-effect transistor ("MOSFET") 330, as depicted in FIG. 3. Other switching devices, including, but not limited to, mechanical switching devices, e.g. microswitches; electrical and electromagnetic switching devices, e.g. solenoids; and semiconductor switching devices can also be used to provide the switching device 230.

The comparator 150 can be a specialized or general purpose device, hi one or more embodiments, the comparator 150 can be a standard operational amplifier 340, as depicted in FIG. 3. In one or more embodiments, the comparator 150 can be an operational amplifier operating without feedback. In one or more embodiments, the comparator 150 can be a dedicated voltage comparator chip, for example an LM339 as offered by National Semiconductor.

Figure 4:
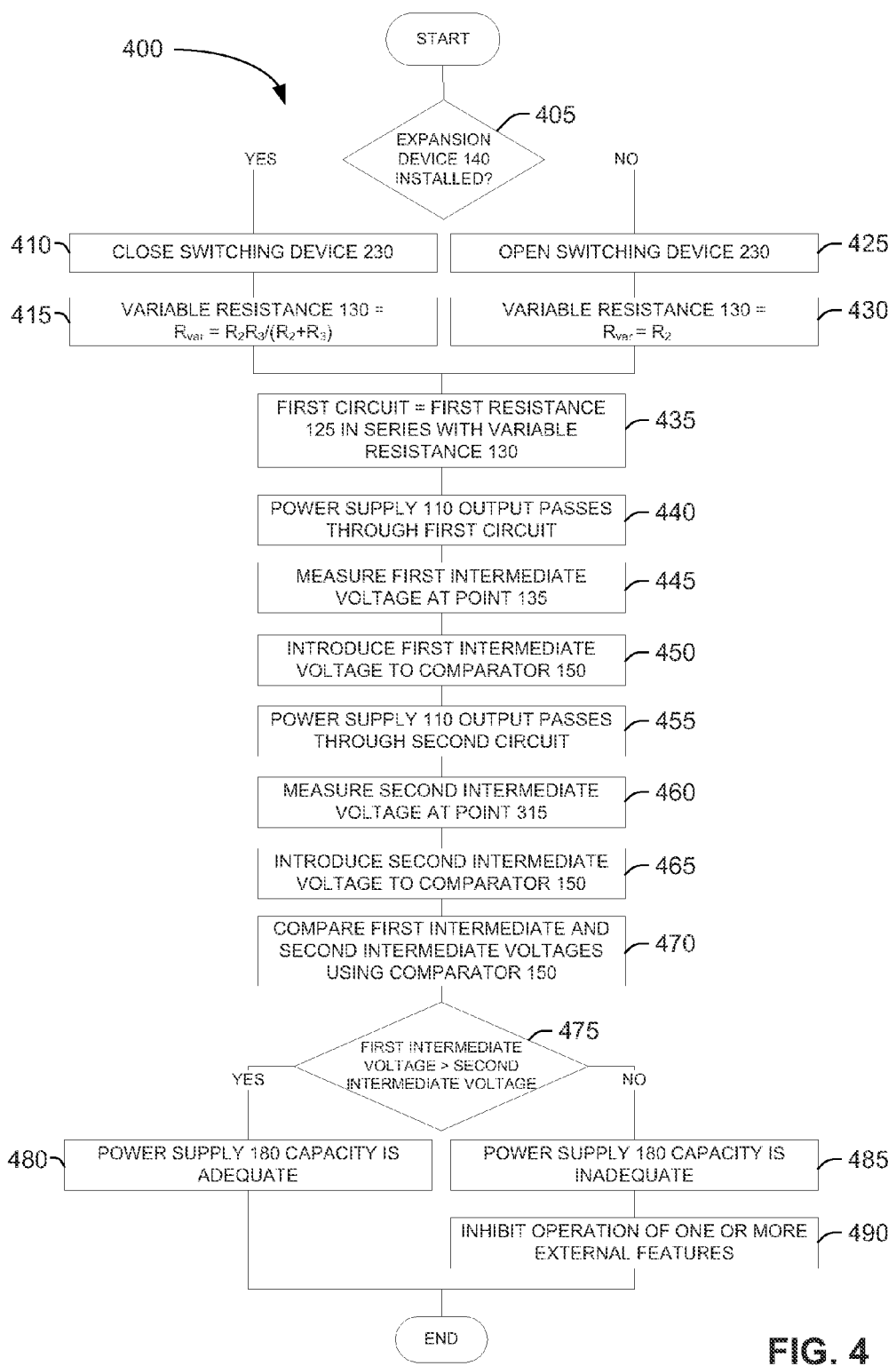
FIG. 4 is a logic flow diagram for an illustrative detection system depicted in FIGS. 1, 2, and 3, in accordance with one or more embodiments described herein.

FIG. 4 is a logic flow diagram for an illustrative detection method using the detection system depicted in FIG. 3, in accordance with one or more embodiments. In one or more embodiments, the method can begin with detecting the installation of one or more expansion devices 140. In one or more embodiments, the one or more expansion devices 140 can be partially or completely disposed in, on, or about the external device 180. In one or more embodiments, the one or more expansion devices 140 can be a card mount device inserted into a complimentary slot disposed partially or completely within the external device 180, for example a computing device.

In one or more embodiments, detection of an expansion device in step 405 can be accomplished using a mechanical switch, an electrical switch, a logical switch, or any combination thereof. For example, the installation of an expansion device 140 within the external device 180 can be detected using a mechanical switch tripped during the insertion of the external device 180. In one or more specific embodiments, detecting the insertion of an expansion device 140 into complimentary slot can be accomplished, for example, using a presence detect bit.

If an expansion device 140 is detected in step 405, the switching device 230 can be dosed in step 410 thereby placing the second resistance 210 in parallel with the third resistance 220 in step 415. The variable resistance 130 of the parallel combination of the second resistance 210 and the third resistance 220 can be calculated using the formula $R_{var}=R_2R_3/(R_2+R_3)$; where $R_{var}$=the variable resistance 130 provided by the parallel combination of the second resistance 210 and the third resistance 220 (in Ohms), $R_2$=second resistance value (in Ohms), and $R_3$=third resistance value (in Ohms). The overall resistance in the first circuit can then be calculated as a simple arithmetic combination of the first resistance 125 and the variable resistance 130, $R_{var}$.

If the expansion device 140 is not detected in step 405, the switching device 230 can remain in the open position in step 425, thereby removing the third resistance 220 from the first circuit. By removing the third resistance 220 from the first circuit, the variable resistance 130 can include only the second resistance 210. In step 435, the first circuit is completed by operatively connecting the first resistance 125 and the variable resistance 130 in series. Thus, in step 435, in the absence of an expansion device 140, the first circuit can be formed by the operative connection of the first resistance 125 and the variable resistance 130, which is equal to the second resistance 210. Conversely, in the presence of an expansion device 140, the first circuit can be formed by the operative connection of the first resistance 125 and the variable resistance 130, which is equal to the resistance of the parallel connected second resistance 210 and third resistance 220.

It should be noted that when switching device 230 is closed, the variable resistance $R_{var}$ will always be less than the second resistance 210. Thus, by placing the first resistance 125 in series with $R_{var}$, the first intermediate voltage measured at point 135 can be less when an expansion device 140 is present and the switching device 230 is closed, than when an expansion device 140 is not present and the switching device 230 is open.

In one or more embodiments, in step 440, all or a portion of the power output from the power supply 110 can be introduced to the first circuit. In one or more embodiments, in step 445, the first intermediate voltage can be measured at point 135 located between the first resistance 125 and the variable resistance 130. In one or more embodiments, in step 450, the first intermediate voltage can be introduced to the comparator 150. In one or more specific embodiments, the first intermediate voltage can be introduced to the first signal input 155 disposed in, on, or about the comparator 150. In one or more specific embodiments, the comparator 150 can be a dedicated device for comparing the voltage of two or more signals, such as the first intermediate voltage and the second intermediate voltage 145.

In one or more specific embodiments, in step 455, all or a portion of the power output from the power supply 110 can be introduced to a second circuit containing the fourth resistance 310 operatively coupled in series with the fifth resistance 320. Where the fourth resistance 310 is operatively connected in series with the fifth resistance 320, the second circuit can, in one or more embodiments, serve as a voltage divider circuit, having a second intermediate voltage at a point 315 disposed between the fourth resistance 310 and the fifth resistance 320. In one or more embodiments, in step 460, the second intermediate voltage can be measured at a point 315 disposed between the fourth resistance 310 and the fifth resistance 320. In one or more embodiments, in step 465, the second intermediate voltage 145 can be introduced to the comparator 150. In one or more specific embodiments, the second intermediate voltage 145 can be introduced to the second signal input 160 disposed in, on, or about the comparator 150.

In one or more embodiments, in step 470, the comparator 150 can compare the first intermediate voltage and the second intermediate voltage. In one or more embodiments, the second intermediate voltage 145 can be set at a value corresponding to the maximum allowable power demand of the external device 180. In one or more embodiments, the first intermediate voltage can be at a value corresponding to the actual power demand of the external device 180 and any installed expansion devices 140. Thus by comparing the first intermediate voltage with the second intermediate voltage, the ability of the power supply 110 to provide sufficient power for both the external device 180 and any installed expansion devices 140 can be confirmed.

The first intermediate voltage can be introduced to a first signal input 155 of the comparator 150. In one or more specific embodiments, the first signal input can be a positive voltage input. The second intermediate voltage can be introduced to a second signal input 160 of the comparator 150. Thus, the comparator 150 can provide a binary output signal 170 dependent upon the relative voltage of the first intermediate voltage and the second intermediate voltage 145. In one or more specific embodiments, the comparator can provide a first signal, for example a binary "high" signal, when the first intermediate voltage exceeds the second intermediate voltage. In one or more specific embodiments, the comparator 150 can provide a second signal, for example a binary "low" signal, when the second intermediate voltage equals or exceeds the first intermediate voltage.

By way of illustrative example, if the second intermediate signal 145 is at a voltage of +5.5VDC and the first intermediate signal is at a voltage of +7.1VDC in the absence of an expansion device 140, introduction of both signals to the comparator 150 would result in a binary "high" output signal 170. If the voltage of the first intermediate signal drops to +5.3VDC in the presence of an expansion device 140, introduction of both signals to the comparator 150 would result in a binary "low" output signal 170. Thus, in one or more embodiments, the binary state of the output signal 170 can provide an indication of whether the power supply 110 has sufficient capacity to power both the external device 180 and any operatively connected expansion devices 140.

After comparing the input signals in step 470, the comparator 150 can provide a binary output signal based upon the difference in voltages between the input signals. In one or more embodiments, the output signal 170 provided by the comparator can be provided to a signal input 185 disposed in, on, or about the external device 180. In one or more specific embodiments, if the external device 180 detects a binary "high" output signal 170 in step 475, i.e. that the first intermediate voltage is greater than the second intermediate voltage, the capacity of the power supply 110 is adequate to power the external device 180 and any operatively connected expansion devices 140 in step 480. Conversely, in one or more specific embodiments, if the external device 180 detects a binary "low" output signal 170 in step 475, i.e. that the second intermediate voltage is equal to or greater than the first intermediate voltage, the power supply 110 is inadequate to power the external device 180 and any operatively connected expansion devices 140 in step 485.

In one or more specific embodiments, if the external device 180 determines the power supply 110 is inadequate in step 485 one or more external features can be disabled or otherwise inhibited in step 490. In one or more embodiments, the one or more external features can include one or more software enabled features, one or more firmware enabled features, one or more hardware enabled features, or any combination thereof. In one or more specific embodiments, the one or more disabled features can include, but are not limited to, a partially or completely disabled power-up sequence to supply all or a portion of the power to the external device 180, or a partially or completely disabled bootstrap sequence to load one or more operating systems into the external device 180.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. While the foregoing is directed to embodiments of the present invention, other and further embodiments of the invention may be devised without departing from the basic scope thereof, and the scope thereof is determined by the claims that follow.

What is claimed is:
1. A system comprising:
 a power supply (110) having a power input (115) and a power output (120);
 a first circuit comprising:
  a first resistance (125) disposed in, on, or about the power supply, operatively coupled in series with a variable resistance (130);
  wherein the first resistance is operably connected to the power output of the power supply;
  wherein a first intermediate voltage exists at a point (135) disposed between the first and the variable resistances;
  wherein the variable resistance is at a maximum value in the absence of an expansion device (140);
  wherein the variable resistance is at less than maximum value in the presence of an expansion device;
 a second intermediate voltage (145), wherein the second intermediate voltage comprises a fixed voltage signal;
 a comparator (150) comprising:
  a first signal input (155) comprising the first intermediate voltage;

a second signal input (160) comprising the second intermediate voltage; and a signal output (165);

wherein the comparator signal output comprises:

a binary high signal (170) if the first signal input voltage exceeds the second signal input voltage; and a binary low signal if the second signal input voltage equals or exceeds the first signal input voltage; and an external device (180) having a signal input (185);

wherein the comparator signal output is operatively connected to the external device signal input;

wherein, when the comparator output signal comprises a binary high signal, one or more external device functions are enabled; and wherein, when the comparator output signal comprises a binary low signal, one or more external device functions are disabled.

2. The system of claim 1, wherein the variable resistance (130) comprises:

a second resistance (210) operably connected in parallel with a third resistance (220) and a switching device (230);

wherein the switching device is closed in the presence of an expansion device (140); and wherein the switching device is open in the absence of an expansion device.

3. The system of claim 1, wherein the second intermediate voltage is provided by a second circuit (300) comprising;

a fourth resistance (310) coupled in series with a fifth resistance (320), having a second intermediate voltage at a point (315) disposed between the fourth and fifth resistances.

4. A system for detecting the presence of an expansion device, comprising:

a power supply (110) having a power input (115) and a power output (120);

a first circuit comprising:

a first resistance (125) disposed in, on, or about the power supply, coupled in series with a variable resistance (130) having a first intermediate voltage at a point (135) disposed between the first and the variable resistance, wherein the variable resistance comprises:

a second resistance (210) coupled in parallel with a third resistance (220) having a serially connected switching device (230);

wherein the switching device is closed in the presence of an expansion device (140) to form the first circuit;

wherein the switching device is open in the absence of an expansion device to form the first circuit;

wherein the switching device (230) halts current flow through the third resistance in the absence of an expansion device (140); and wherein the switching device permits current flow through the third resistance in the presence of the expansion device (140);

a second circuit (300) comprising:

a fourth resistance (310) operatively coupled in series with a fifth resistance (320), having a second intermediate voltage at a point (315) disposed between the fourth and fifth resistances;

a comparator (150) having a first signal input (155), a second signal input 160), and a signal output (165);

wherein the first intermediate voltage is operatively connected to the first signal input;

wherein the second intermediate voltage is operatively connected to the second signal input;

wherein the comparator output signal (170) comprises a binary high signal if the first signal input exceeds the second signal input; and wherein the comparator output signal comprises a binary low signal if the second signal input equals or exceeds the first signal input; and an external device (180) having at least one signal input (185);

wherein the comparator output signal is operatively connected to the at least one signal input; and wherein, when the comparator output signal comprises a binary high signal, one or more external device features are enabled; and wherein, when the comparator output signal comprises a binary low signal, one or more external device features are disabled.

5. The system of claim 4, wherein the first switching device (230) comprises a metal-oxide-semiconductor field-effect transistor ("MOSFET").

6. The system of claim 4, wherein the at least one signal input on the external device (180) comprises an input (185) disposed at least partially within a computing device; and wherein the one or more external device features comprises at least a portion of the computing device powering sequence.

7. The system of claim 4, wherein the power supply output (120) provides at least a portion of the power for the first circuit and the second circuit.

8. The system of claim 4, wherein the expansion device (140) comprises a slot mountable device adapted to operably connect to an expansion slot disposed on a motherboard; and wherein the presence of an expansion device is detected using a presence detect bit disposed in the expansion slot.

9. The system of claim 4, wherein the first resistance (125) comprises a resistor having a resistance of about 100K ohms to about 500K ohms.

10. The system of claim 4, wherein the second resistance (210) comprises a resistor having a resistance of about 50K ohms to about 250K ohms.

11. The system of claim 4, wherein the third resistance (220) comprises a resistor having a resistance of about 50K ohms to about 500K ohms.

12. A method for detecting one or more expansion devices (140); comprising:

operably connecting a power supply (110) output (120) to an external device (180);

passing at least a portion of the power supply output through a first circuit comprising a first resistance (125) and a variable resistance (130) operably connected in series;

measuring a first intermediate voltage at a point (115) disposed between the first resistance and the variable resistance;

passing at least a portion of the power supply output through a second circuit comprising a fourth resistance (310) and a fifth resistance (320) operably connected in series;

measuring a second intermediate voltage at a point (315) disposed between the fourth resistance and the fifth resistance;

comparing the first intermediate voltage with the second intermediate voltage using a comparator (150); and enabling one or more external device features when the first intermediate voltage exceeds second intermediate voltage.

13. The method of claim 12, wherein the variable resistance (130) comprises:
- a third resistance (220) operably connected in parallel with a second resistance (210); and
- a switching device (230) operably connected in series with the third resistance;
  - wherein, when closed, the switching device permits all or a portion of the current in the first circuit to flow through the third resistance; and
  - wherein, when open, the switching device prevents all or a portion of the current in the first circuit to flow through the third resistance.

14. The method of claim 12, wherein comparing the first intermediate voltage with the second intermediate voltage comprises:
- operably connecting the first intermediate signal to a first signal input (155) disposed on a comparator (150);
- operably connecting the second intermediate signal to a second signal input (160) disposed on the comparator;
- generating a comparator output signal (170) based upon the first signal input and the second signal input;
  - wherein the comparator output signal is a binary high signal if the first intermediate voltage exceeds the second intermediate voltage; and
  - wherein the comparator output signal is a binary low signal if the second intermediate voltage is greater than or equal to the first intermediate voltage.

15. The method of claim 12, wherein the enabling one or more external device features comprises:
- confirming the capacity of the power supply (110); and
- enabling at least a portion of the external device (180) powering sequence.

* * * * *

UNITED STATES PATENT AND TRADEMARK OFFICE
CERTIFICATE OF CORRECTION

PATENT NO. : 8,796,880 B2  
APPLICATION NO. : 13/203608  
DATED : August 5, 2014  
INVENTOR(S) : Robert C Brooks et al.

Page 1 of 1

It is certified that error appears in the above-identified patent and that said Letters Patent is hereby corrected as shown below:

In the Claims:

In column 11, line 30, in Claim 3, delete "comprising;" and insert -- comprising: --, therefor.

In column 11, line 65, in Claim 4, delete "160)," and insert -- (160), --, therefor.

In column 12, line 49, in Claim 12, delete "(140);" and insert -- (140), --, therefor.

Signed and Sealed this
Eighteenth Day of November, 2014

Michelle K. Lee
*Deputy Director of the United States Patent and Trademark Office*